(12) United States Patent
Bywaters et al.

(10) Patent No.: US 8,922,038 B2
(45) Date of Patent: Dec. 30, 2014

(54) WIND POWER UNIT HAVING AN UNDERSLUNG TRANSFORMER

(75) Inventors: Garrett L. Bywaters, Waitsfield, VT (US); Trevor H. Cole, Duxbury, VT (US)

(73) Assignee: Northern Power Systems, Inc., Barre, VT (US)

( * ) Notice: Subject to any disclaimer, the term of this patent is extended or adjusted under 35 U.S.C. 154(b) by 529 days.

(21) Appl. No.: 13/276,941

(22) Filed: Oct. 19, 2011

(65) Prior Publication Data

US 2012/0146335 A1    Jun. 14, 2012

Related U.S. Application Data

(60) Provisional application No. 61/421,041, filed on Dec. 8, 2010.

(51) Int. Cl.
*F03D 9/00* (2006.01)

(52) U.S. Cl.
USPC .......................................................... 290/44

(58) Field of Classification Search
USPC ..................................... 290/44, 55
See application file for complete search history.

(56) References Cited

U.S. PATENT DOCUMENTS

| | | | |
|---|---|---|---|
| 6,750,559 B2 * | 6/2004 | Becker ............................ | 290/55 |
| 7,075,192 B2 | 7/2006 | Bywaters et al. | |
| 7,119,453 B2 | 10/2006 | Bywaters et al. | |
| 7,168,251 B1 * | 1/2007 | Janssen ......................... | 60/641.1 |
| 2009/0224607 A1 | 9/2009 | Kjaer et al. | |
| 2010/0011575 A1 | 1/2010 | Numajiri | |

FOREIGN PATENT DOCUMENTS

| | | |
|---|---|---|
| DE | 102007062622 A1 | 6/2009 |
| EP | 1291521 A1 | 3/2003 |
| WO | 2007096008 A1 | 8/2007 |
| WO | 2010026114 A2 | 3/2010 |
| WO | 2010069314 A2 | 6/2010 |
| WO | 2010069315 A2 | 6/2010 |

OTHER PUBLICATIONS

PCT International Search Report and Written Opinion dated Mar. 29, 2012 for related PCT/US2011/063253 entitled "Wind Power Unit Having an Underslung Transformer," Bywaters et al.

* cited by examiner

*Primary Examiner* — Julio C. Gonzalez

(74) *Attorney, Agent, or Firm* — Downs Rachlin Martin PLLC

(57) ABSTRACT

A wind power unit that includes a tower and a support structure that cantilevers from the upper end of the tower. The wind power unit includes an electrical transformer that is suspended from the support structure. In one embodiment, the transformer extends through an opening in the bottom portion of a nacelle that encloses the support structure and includes electrical connections on its upper end that are accessible from inside the nacelle via a service opening in a floor located above the transformer.

18 Claims, 5 Drawing Sheets

US 8,922,038 B2

WIND POWER UNIT HAVING AN UNDERSLUNG TRANSFORMER

RELATED APPLICATIONS DATA

This application claims the benefit of priority of U.S. Provisional Patent Application Ser. No. 61/421,041, filed on Dec. 8, 2010, and titled "Wind Power Unit Having an Underslung Transformer," which is incorporated herein by reference in its entirety.

FIELD OF THE INVENTION

The present invention generally relates to the field of wind power units. In particular, the present invention is directed to a wind power unit having an underslung transformer.

BACKGROUND

Wind power units (WPUs) convert the energy in wind into electrical power. The primary components of a WPU are an electrical power generator and a wind turbine that converts wind energy into mechanical energy that then drives the generator. When a WPU provides power to a utility grid, the output of the generator goes to a step-up transformer that steps-up the voltage output from the generator to the voltage required by the grid.

SUMMARY OF THE DISCLOSURE

In one implementation, the present disclosure is directed to a wind power unit. The wind power unit includes a support tower having a top end and a bottom end opposite the top end; a nacelle coupled to the top end of the tower; a support structure cantilevered from the top end of the support tower and supporting at least part of the nacelle; a wind turbine supported by the tower at the top end; an electrical power generator operatively connected to the wind turbine; and an electrical transformer attached to the support structure so as to depend therefrom in an underslung manner, wherein the electrical transformer is substantially the only piece of electrical equipment suspended in the underslung manner.

In another implementation, the present disclosure is directed to a method of engaging an electrical transformer with a wind power unit. The wind power unit includes lowering a winch cable from a nacelle of the wind power unit through a service opening in a floor located in the nacelle; securing the winch cable to the electrical transformer in a manner suitable for lifting the electrical transformer using the winch cable; lifting the electrical transformer to a position proximate to a support structure of the wind power unit; and connecting the electrical transformer to the support structure so that the electrical transformer is substantially the only piece of electrical equipment suspended from the support structure in an underslung manner.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
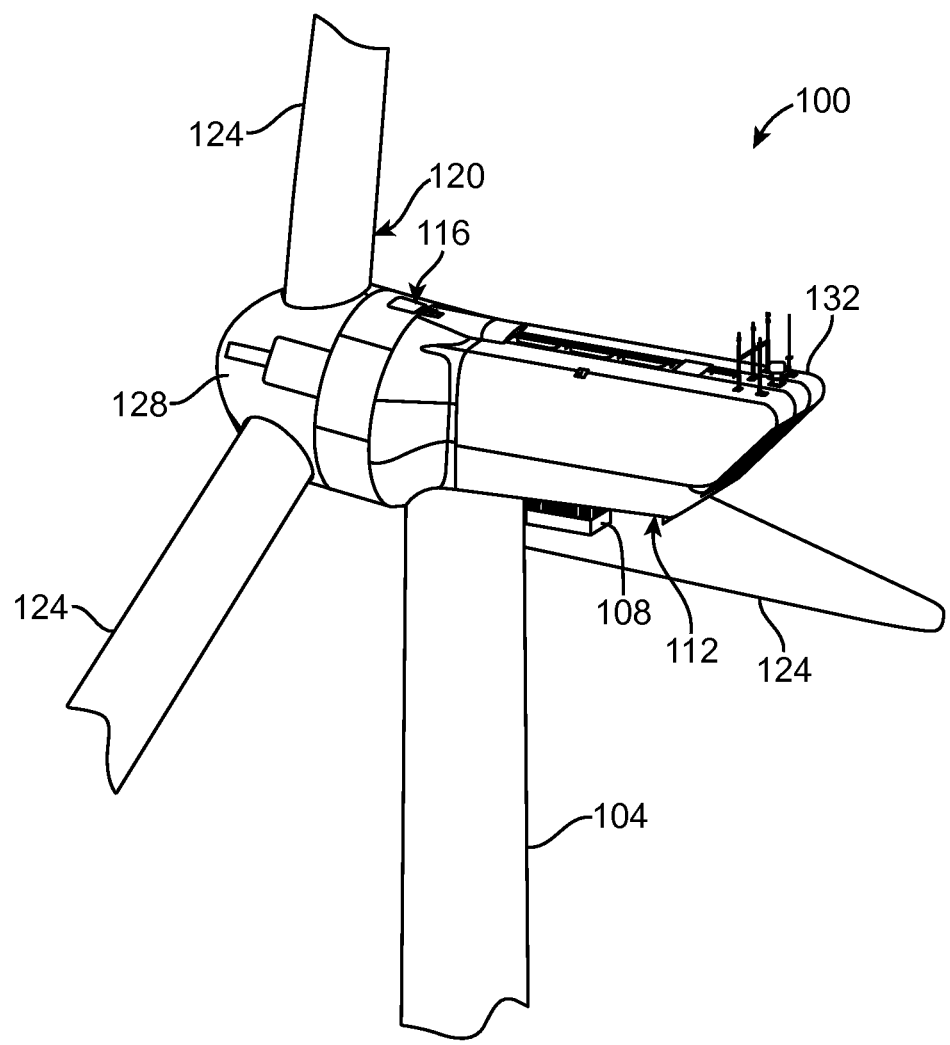
FIG. 1 is an elevational perspective view of a wind power unit (WPU) having an underslung electrical transformer in accordance with the present disclosure.

Referring now to the drawings, FIG. 1 illustrates an upwind-rotor-type wind power unit (WPU) 100 that includes a support tower 104 and an electrical transformer 108 that is mounted, in an underslung fashion, to a part of the WPU that cantilevers from the support tower, here a downwind structure 112 for the sake of illustration. In this example, support tower 104 is attached to a solid foundation embedded in the ground. However, the concepts contained in the present disclosure are equally applicable to offshore WPUs. As described below in detail, locating transformer 108 in this manner can provide any one or more of a number of advantages. However, prior to describing various advantages, it is useful to describe some of the primary components of exemplary WPU 100 to provide context to such advantages.

In this example, WPU 100 has an electrical power generator 116, here a direct-drive, permanent-magnet generator, that is coupled to support tower 104 so as to be upwind of the tower during normal operation. Consequently, with underslung transformer 108 located as shown in FIG. 1, it is located downwind of tower 104 during normal operation of WPU 100. Generator 116 is driven by a wind turbine 120, which in this case has a central hub (not seen in FIG. 1) that supports three blades 124 and is protected by a nosecone 128. WPU 100 also includes a nacelle 132, which is largely the enclosure for downwind structure 112. As those skilled in the art will readily understand, nacelle 132 contains and protects various equipment (not shown) that contributes to the proper functioning of WPU 100. Examples of equipment that can be contained by nacelle 132 include electronics for controlling the operation of generator 116 and conditioning the electrical power output generated thereby, systems for controlling and monitoring the condition and performance of WPU 100, and equipment relating thereto, among other things.

Figure 2A:
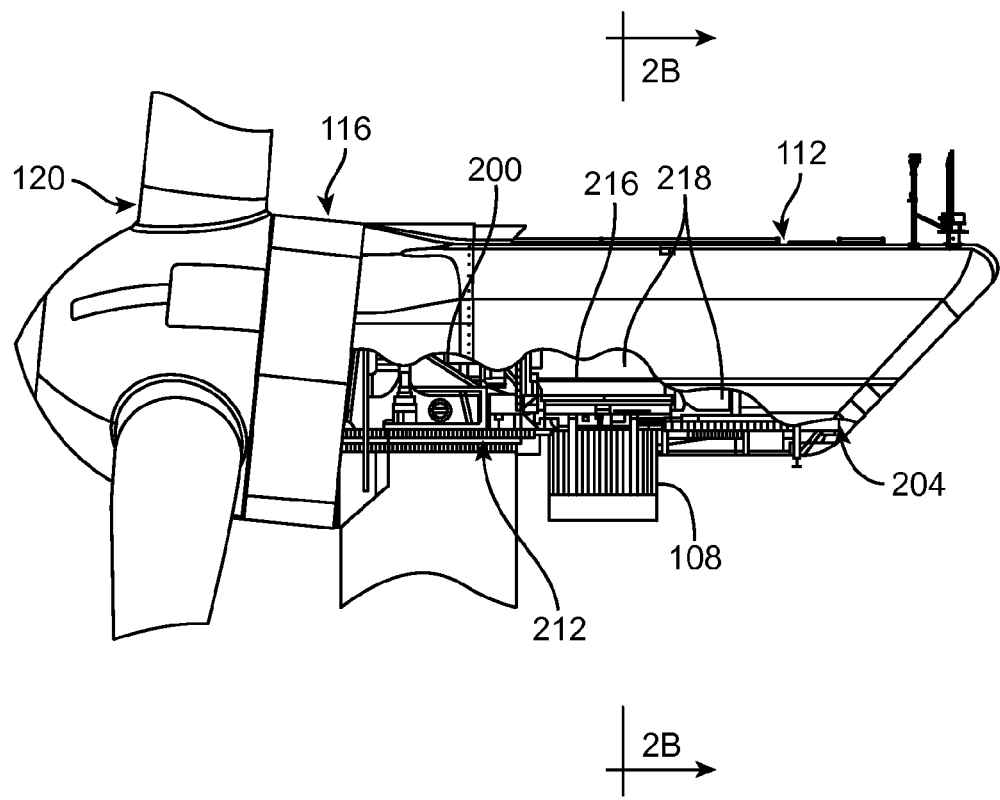
FIG. 2A is an enlarged partial cutaway partial view of the WPU of FIG. 1 illustrating the underslung electrical transformer connected to a support structure inside the nacelle.
Figure 2B:
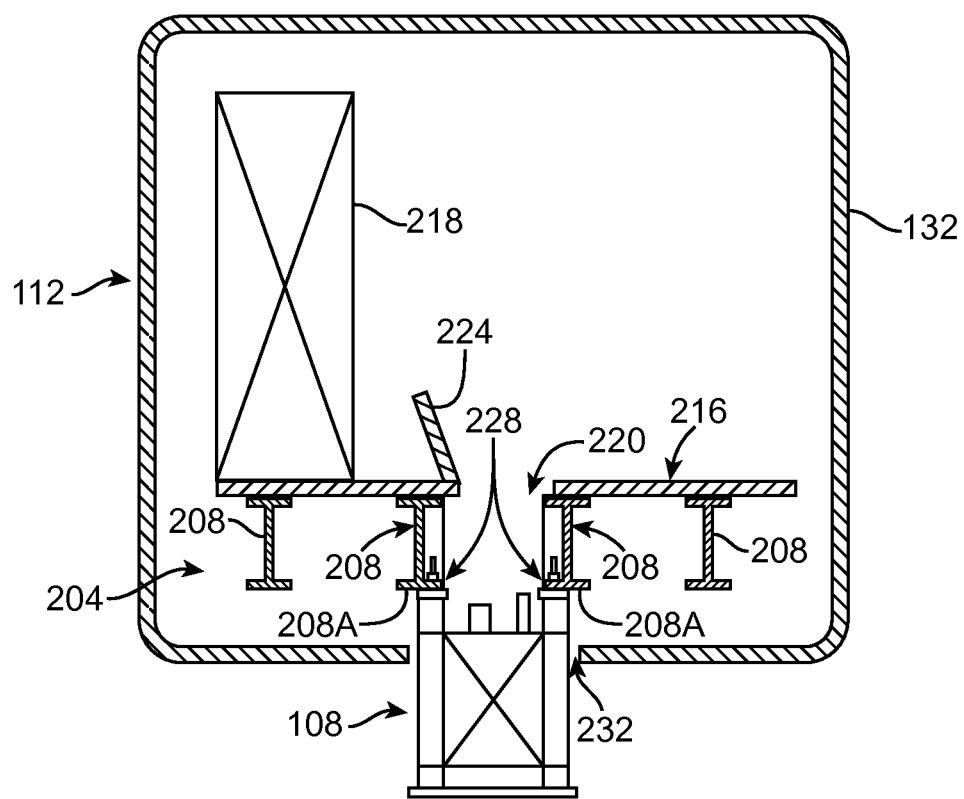
FIG. 2B is an enlarged cross-sectional view as taken along the line 2B-2B of FIG. 2A.

As seen in FIG. 2A, WPU 100 includes a mainframe assembly 200 that supports wind turbine 120, generator 116, and downwind structure 112 and allows the wind turbine 120 to be faced in the proper direction relative to the wind during operation of the WPU. Downwind structure 112 includes a primary support structure 204 that is cantilevered from mainframe assembly 200 so as to extend in a direction away from generator 116 and wind turbine 120. In the embodiment shown, support structure 204 comprises a frame that includes four cantilevered beams 208 (FIG. 2B), although in other embodiments the number of cantilevered beams can be different to suit any of a variety of design criteria. Moreover, in some embodiments support structure 204 might not include any cantilevered beams, such as would be the case if nacelle 132 is designed to carry the requisite cantilevered loading. However, relative to the example shown, each cantilevered beam 208 is rigidly connected to mainframe assembly 200 using a rigid, full-moment connection 212. Moment connections 212 transfer the weight of support structure 204 and the components supported thereby, including underslung transformer 108, to mainframe assembly 200. As best seen in FIG. 2B, support structure 204 supports a floor 216 that allows personnel to readily move about inside nacelle 132 to access various equipment and other items inside the nacelle.

As mentioned above, examples of equipment contained in nacelle 132 includes WPU control electronics, power conversion electronics (e.g., AC-to-DC and/or DC-to-AC power converters, as required), and low and high voltage distribution panels, which are collectively represented in FIG. 2A by electrical equipment 218. As those skilled in the art will readily appreciate, the underslung nature of transformer 108 connotes that it is essentially only the transformer that is suspended in an underslung manner. That is, electrical equipment other than transformer 108, i.e., electrical equipment 218, is located at a higher elevation (relative to the ground or other suitable datum) than the transformer. In essence, it is substantially only transformer 108, i.e., transformer and any transformer-suspending structure (if any), such as a suspended cradle, that is suspended from support structure 204. Except for cabling and other components that communicate electrical power and electrical signals between the electrical equipment at the top of tower 104 and the bottom of the tower, every other primary component of the electrical systems supporting the operation and electrical output of WPU 100 (FIG. 1) is located separately from, and in this particular example higher than, transformer 108.

Figure 3:
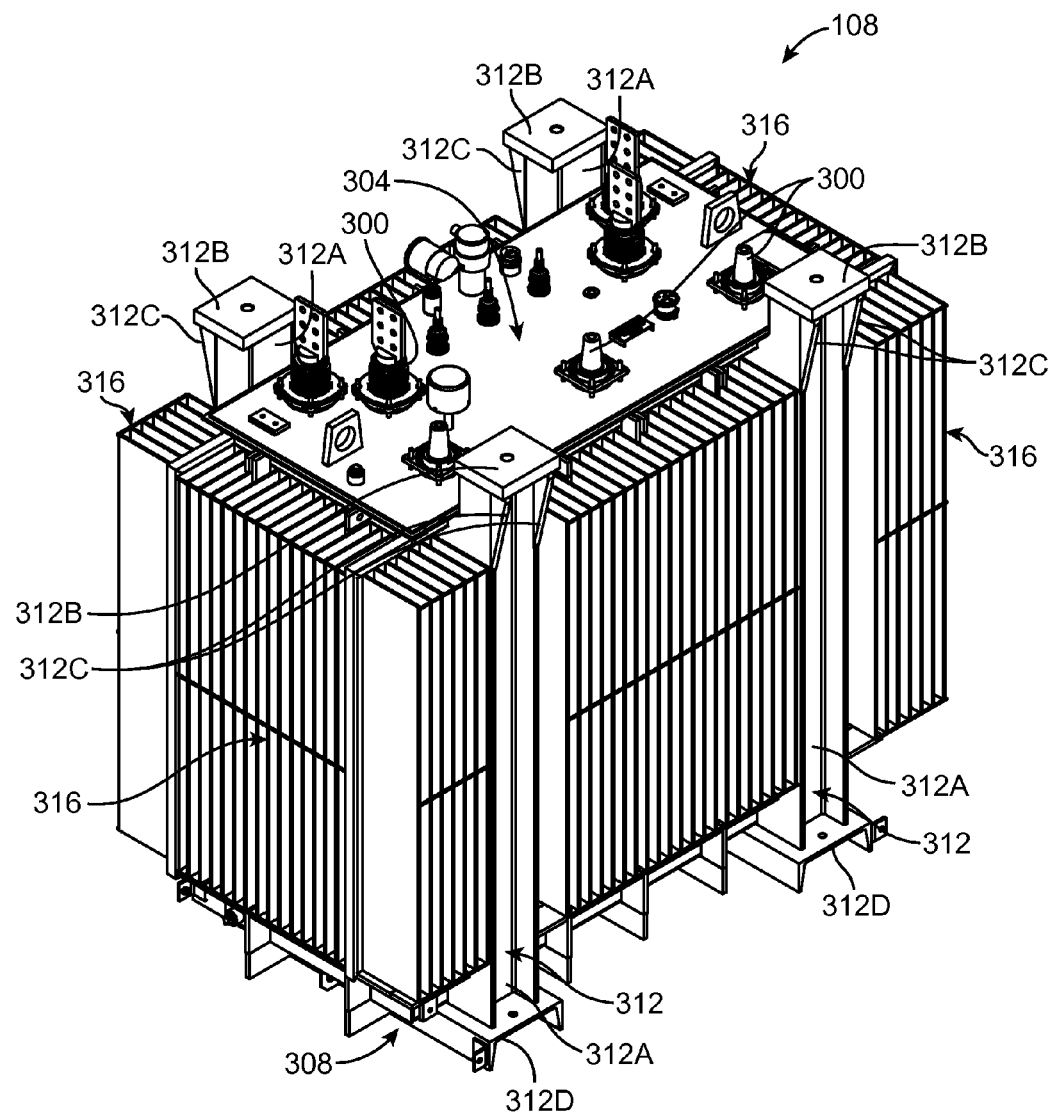
FIG. 3 is an enlarged perspective view of the underslung electrical transformer of FIGS. 1 and 2A-B illustrating its structural and electrical connections.

As seen in FIG. 3, transformer 108 of this example includes a number of primary and secondary-voltage terminals 300 and other features on its upper end. In the embodiment shown, a service opening 220 (FIG. 2B) in floor 216 is provided to allow workers to access these features from inside nacelle 132. For example, once transformer 108 is secured in place, workers can make the necessary connections between the transformer and the corresponding connections of WPU 100. Of course, such connections can be disconnected as needed, for example, to replace transformer 108 as discussed below. In addition, if transformer 108 includes any testing connections/ports and any observation ports, workers could also access those through service opening 220 in floor 216.

As those skilled in the art will readily appreciate, service opening 220 can be a hatchway or other opening that is closed by a hatch 224 or other closure, such as a removable piece of flooring. In this example, hatch 224 is pivotably secured to floor 216. Alternative closures can be, for example, laterally slidable or vertically liftable to expose the corresponding service opening.

Referring again to FIG. 3, transformer 108 is an assembly of a number of components that in this embodiment are integrated into monolithic structure. Primary components of exemplary transformer 108 include a transformer component 304, a base 308, two U-shaped hanger assemblies 312, and a heat sink, which in this example comprises a plurality of heat-sink fins 316 located on all lateral sides of the transformer component. In other embodiments, one or more alternative heat sinks can be provided. For example, a heat sink could be provided on the lower end of transformer 108, among other alternatives.

While exemplary transformer 108 is shown with particularity for the sake of illustration, those skilled in the art will readily appreciate that a transformer suitable for use in an underslung manner as disclosed herein can be virtually any transformer that is either adapted for hanging, for example, by the inclusion of hangers or other structures that attach to the support structure, or is capable of being suspended using a suitable suspension-type support, such as a hanging cradle. The underslung character of a transformer suspended from a WPU in the manner of the present disclosure is not limited by any particular instrumentalities used to effect the suspension, or underslinging.

Returning to the particular example at hand, each hanger assembly 312 includes an H-shaped structural member 312A and a connection plate 312B fixed to the H-shaped member at the upper end of that member. Here, each hanger assembly 312 additionally includes stiffeners 312C for stiffening the corresponding connection plate 312B. Each hanger assembly 312 further includes a C-shaped structural cross-member 312D, each fixedly connected to the lower ends of H-shaped structural members 312A on opposing sides of transformer 108 so that each hanger assembly 312 generally forms a cradle relative to transformer component 304 and base 308. Those skilled in the art will understand that in some embodiments hanger assemblies 312 can be integrated with transformer 108 such that base 308 and structural members 312A are integrally welded or otherwise integrally secured to transformer component 304. Skilled artisans will also understand that in other embodiments, hanger assemblies 312 and base 308 can form a separate cradle to which transformer component 304 is attached, for example, using bolts or other connection means between the bottom of the transformer component and base. In still other embodiments, the transformer might have a transformer component like transformer component 304, but simply have a set of attachment structures (not shown) present on its top that permits the underslinging of the transformer. Still other variants are possible for supporting an underslung transformer.

Referring back to FIG. 2B, in the example shown hanger assemblies 312 are connected to support structure 204 via bolted connections 228 to transformer mounting points 208A located on the underside of support structure 204. Bolted connections 228 are sufficiently tightened so that transformer 108 becomes rigidly fixed to support structure 204 when the transformer is fully installed. It is noted that while bolted connections are shown, other types of connections can be used, such as welded connections, hook-type connections, and pin-type connections, among others. More exotic connections, such as horizontally sliding track-type connections, can also be used, if desired. In addition, it is noted that more or fewer than four attachment points (here four bolted connections 228) can be provided to suit a particular design. Structural engineers and other skilled artisans will be able to design suitable suspension-type connections when the configurations of the particular transformer, any corresponding suspension structure, if any, and the support structure are known.

As seen in FIGS. 1, 2A, and 2B, when transformer 108 is in its operational location, it extends through a transformer opening 232 (labeled in FIG. 2B) in nacelle 132. As those skilled in the art will appreciate, having at least a portion of the heat sink(s), here heat-sink fins 316, present outside of nacelle 132 so as to be exposed to the air surrounding WPU 100 to facilitate cooling of transformer 108. It is noted that in other embodiments, more or less of transformer 108 can be present outside of nacelle 132. At one extreme and depending on the configuration of nacelle, the entirety of transformer 108 can be located outside of the nacelle. Indeed, in one such example, the nacelle enclosing downwind structure 112 could be located so that it is in contact with transformer mounting points 208A, and transformer 108 could be connected with bolts that extend through both the nacelle 132 and the flanges.

At another extreme, transformer 108 could be located entirely within nacelle 132. In this example, nacelle 132 could be provided with vents to allow heat from the transformer to escape from the nacelle and/or air from outside the nacelle to flow into the region within the nacelle containing the transformer. In another example in which the transformer includes a transformer component and a heat sink only at the bottom end of the transformer component, the entirety of the transformer component could be located inside the nacelle and only the heat sink be located below, and outside of the nacelle.

Those skilled in the art will recognize that the design of WPU 100 shown in which generator 116 (FIG. 1) is located upwind of tower 104 is but one design that can benefit from an underslung transformer design. For example, those skilled in the art will appreciated that the present disclosure can apply equally well to a WPU having a downwind rotor configuration. Furthermore, those skilled in the art will understand that other types of support structures and other manners of coupling such support structures to the corresponding towers are possible and that providing examples of such alternatives are not necessary for skilled artisans to be able to implement the broad features of the present disclosure to their fullest scope, as represented by the claims appended hereto. In addition, it is noted that while generator 116 in this example is of the direct-drive permanent-magnet type, the underslung transformer concepts disclosed herein can be used with generators of other types, such as non-permanent-magnet types, gear-driven types, and any combination thereof, as well as gear-driven permanent-magnet types.

Figure 4:
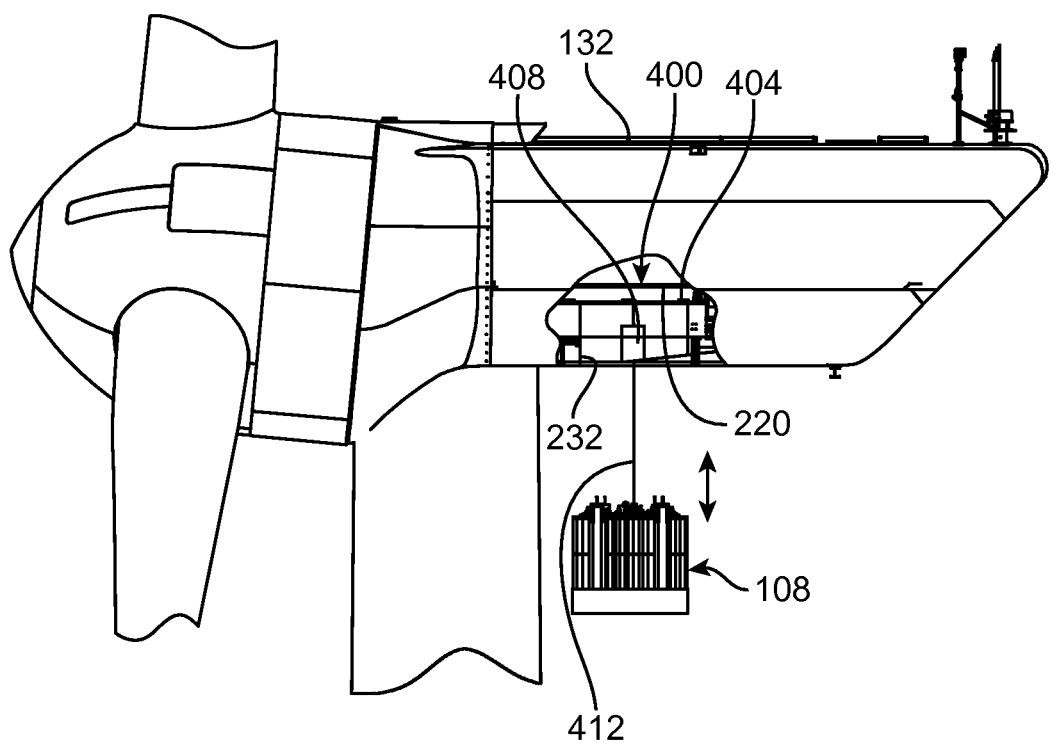
FIG. 4 is an enlarged elevational cross-sectional view of the WPU of FIG. 1, showing the underslung electrical transformer being lifted to its operational position.

In addition to the underslung transformer configuration making it easy for WPU designers to provide adequate cooling to power transformers of WPUs, the configuration can also simplify the processes of installing and removing power transformers. For example, FIG. 4 illustrates a nacelle-based winch system 400 workers can use to raise and lower underslung transformer 108, as well as, if necessary, to move any tools or other items needed for installing, servicing, and/or removing the transformer. In this example, during installation, transformer 108 can be lifted into its securing position in a single vertical lift, i.e., it is not necessary to avoid any obstacles or move the transformer laterally to move it into securing position from a pick-point directly below transformer and service openings 232, 220. Similarly, removal of transformer 108 can be performed in a single vertical drop to a location directly below transformer and service openings 232, 220.

In the embodiment shown in FIG. 4, winch system 400 includes a frame 404, a winch 408, and winch cable 412. Frame 404 can be temporary or permanent, and can be secured to primary support structure 204 or other load-bearing structure within nacelle 132 as needed. It is noted that if the support structure within nacelle 132 is so designed, a separate frame may not be necessary, in which case winch 408 attaches directly to the support structure. It is noted that winch 408 could be supported by a track, gantry, or other structure that allows the winch to be moveable within nacelle 132. In addition, winch 408 may be located away from or to the side of service opening 220, in which case one or more pulleys/blocks (not shown) can be used to direct winch cable 412 as needed. A person skilled in the art will appreciate the variety of arrangements, connection methods and locations, and uses possible with a nacelle-based winch system.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A wind power unit that, when installed, is surrounded by an ambient air environment, the wind power unit comprising:
   a support tower having a top end and a bottom end opposite said top end;
   a nacelle coupled to said top end of said tower;
   a support structure cantilevered from said top end of said support tower and supporting at least part of said nacelle;
   a wind turbine supported by said tower at said top end;
   an electrical power generator operatively connected to said wind turbine; and
   an electrical transformer attached to said support structure so as to depend therefrom in an underslung manner, wherein said electrical transformer is substantially the only piece of electrical equipment suspended in said underslung manner; said electrical transformer includes an exterior having a heat sink and, when the wind power unit is operating in the ambient air environment, said heat sink is exposed to the ambient air environment.

2. A wind power unit according to claim 1, wherein said support structure is located within said nacelle.

3. A wind power unit according to claim 2, wherein said nacelle includes a bottom having a transformer opening, said electrical transformer extending through said transformer opening.

4. A wind power unit according to claim 1, wherein an upper end of said electrical transformer is accessible from within said nacelle.

5. A wind power unit according to claim 4, wherein said support structure supports a floor containing a service opening located over at least a portion of said upper end of said electrical transformer.

6. A wind power unit according to claim 5, wherein said electrical transformer includes a plurality of electrical terminals designed and configured to be accessible from said service opening.

7. A wind power unit according to claim 1, wherein said electrical transformer includes a plurality of fins designed and configured to enhance thermal cooling of said electrical transformer.

8. A wind power unit according to claim 7, wherein at least a portion of said plurality of fins is located external to said nacelle.

9. A wind power unit according to claim 1, wherein said electrical transformer includes at least one rigid structural mount fixedly connected to said support structure.

10. A wind power unit according to claim 1, further comprising a mainframe assembly supporting said wind turbine, said electrical power generator, and said support structure.

11. A wind power unit according to claim 10, wherein said support structure includes a plurality of cantilevered beams each secured to said mainframe assembly by a full-moment connection.

12. A wind power unit according to claim 11, wherein said electrical transformer is fixedly secured to two of said plurality of cantilevered beams.

13. A wind power unit according to claim 1, further comprising a winch system having a winch cable, said winch system configured to allow said winch cable to extend through said service opening and to be connectable to said transformer.

14. A method of engaging an electrical transformer with a wind power unit surrounded by an ambient air environment, wherein the electrical transformer includes an exterior having a heat sink, the method comprising:
   lowering a winch cable from a nacelle of the wind power unit through a service opening in a floor located in the nacelle;

securing the winch cable to the electrical transformer in a manner suitable for lifting the electrical transformer using the winch cable;

lifting the electrical transformer to a position proximate to a support structure of the wind power unit; and connecting the electrical transformer to the support structure to install the electrical transformer on the wind power unit so that the electrical transformer is substantially the only piece of electrical equipment suspended from the support structure in an underslung manner; and the heat sink is exposed to the ambient air environment when the wind power unit is complete.

15. A method according to claim 14, wherein said connecting the electrical transformer to the support structure includes fixedly fastening mounts on the electrical transformer to the support structure.

16. A method according to claim 15, wherein said connecting the electrical transformer to the support structure includes effecting said connecting via said service opening.

17. A method according to claim 15, wherein connecting the electrical transformer to the support structure includes connecting the electrical transformer so that the electrical transformer extends through the transformer opening and a portion of the electrical transformer is located outside of the nacelle during operation of the wind power unit.

18. A method according to claim 14, further comprising making electrical connections between the electrical transformer and the wind power unit via the service opening.

* * * * *

UNITED STATES PATENT AND TRADEMARK OFFICE
CERTIFICATE OF CORRECTION

| | |
|---|---|
| PATENT NO. | : 8,922,038 B2 |
| APPLICATION NO. | : 13/276941 |
| DATED | : December 30, 2014 |
| INVENTOR(S) | : Garrett L. Bywaters et al. |

It is certified that error appears in the above-identified patent and that said Letters Patent is hereby corrected as shown below:

In the claims

-Column 7, claim 17, line 20. Specifically, remove reference to "claim 15" and replace with "claim 14" to read as "A method according to claim 14, wherein connecting"

Signed and Sealed this
Fourteenth Day of June, 2016

Michelle K. Lee
*Director of the United States Patent and Trademark Office*